Jan. 21, 1941.  S. S. GREEN  2,229,072
WATT-HOUR METER
Filed Feb. 16, 1938
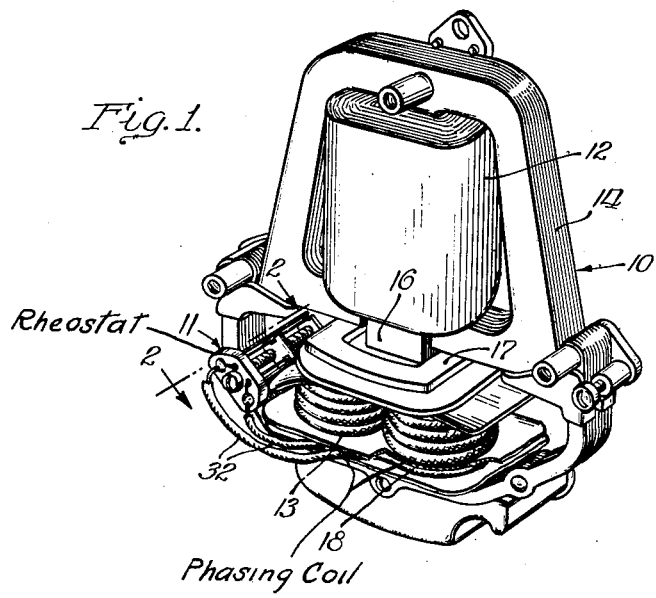
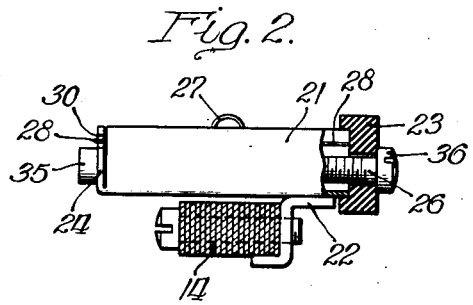
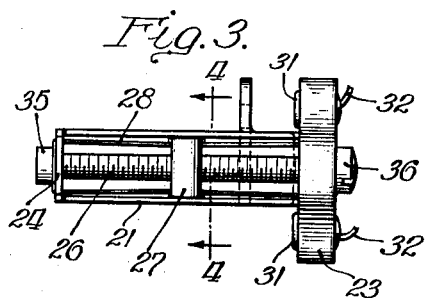
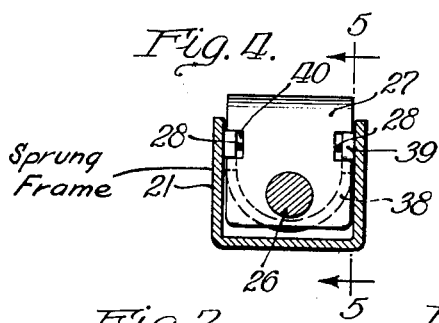
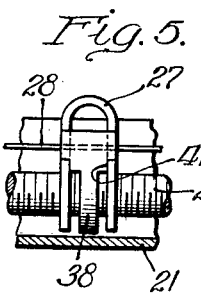
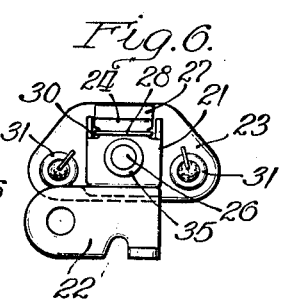
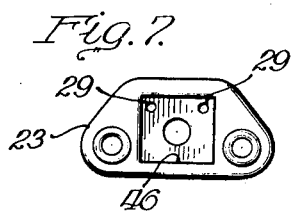
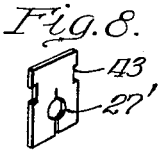
Inventor:
Stanley S Green,
By Louis Robertson atty.

Patented Jan. 21, 1941

2,229,072

UNITED STATES PATENT OFFICE 2,229,072

WATT-HOUR METER

Stanley S. Green, La Fayette, Ind., assignor to Duncan Electric Manufacturing Company, La Fayette, Ind., a corporation of Illinois Application February 16, 1938, Serial No. 190,725

4 Claims. (Cl. 171—264)

This invention relates to watt-hour meters and particularly to the provision of an extremely reliable and constant phasing rheostat therein, although in some of its aspects it relates broadly to rheostats.

In order for an alternating current watt-hour meter to be accurate the alternations of the flux produced by the voltage coil must be perfectly timed with respect to the alternations of the flux produced by the current coil. The adjustments which produce this proper timing of the two sets of alternating fluxes is called the phasing adjustment. In other words, when the alternating cycle of the voltage flux is at a given phase, the alternating cycle of the current flux must be at an exactly predetermined phase. Under simplest conditions the phase of one must be in advance a certain amount (one-quarter cycle) with respect to the phase of the other, but this point is not important to an understanding of the present invention. It is important, however, to recognize that for accuracy of the meter the phasing of the meter, once accurately adjusted, must remain constant throughout the life of the meter.

Heretofore this phasing has been accomplished through the use of a small coil of wire forming a closed circuit around each pole of the current magnet of the meter, the end portions of the coil being formed of a resistance wire which could be twisted together to shorten the amount of resistance wire in the circuit. Permanency of the adjustment once made was secured by soldering the resistance wires at their point of contact. This was obviously a very cumbersome procedure, but prior to the present invention it has been considered necessary in order to obtain absolute permanency of adjustment.

The present invention avoids this difficulty by the use of a rheostat in place of the twisted and soldered joint. The use of a rheostat would have been considered out of the question prior to this invention because of the inconstancy of the rheostat, particularly of the contact resistance between the sliding portions of the rheostat, and because of the difficulties of obtaining sufficient delicacy of adjustment in a rheostat, and also because of the small space available in meters and the high cost of any rheostats which would even approach satisfactory operation. The present invention has overcome these difficulties by the provision, in combination with the phasing coil, of a new rheostat embodying various novel features.

The advantages and objects of the invention will be made more apparent by the following description and by the drawing, in which:

Fig. 1 is a perspective view showing the driving unit of a watt-hour meter with this invention applied thereto.

Fig. 2 is a fragmentary sectional view taken approximately on the line 2—2 of Fig. 1 and showing a side of the rheostat with a portion broken away for the sake of clarity.

Fig. 3 is a plan view of the rheostat used in Fig. 1.

Fig. 4 is a sectional view taken approximately on the line 4—4 of Fig. 3.

Fig. 5 is a fragmentary sectional view taken on the line 5—5 of Fig. 4 and showing details of the sliding contact.

Fig. 6 is a rear view of the rheostat of Fig. 3.

Fig. 7 is a rear view of the insulating circuit plate forming the front end of the rheostat.

Fig. 8 is a modified form of sliding contact which may be used in place of the sliding contact shown in Figs. 1 to 7.

Although this invention may take numerous forms, only two have been chosen for the purpose of illustration. The invention is especially concerned with the combination of an electromagnetic driving unit 10 for watt-hour meters or the like and a rheostat 11 for adjusting the phasing thereof. Such electromagnetic driving units commonly include a voltage coil 12 and current coils 13, each surrounding suitable laminated cores formed by the laminations 14. The pole portion of the voltage core is seen at 16. The disc, not shown, rotates immediately below this pole portion, and the pole faces of the current cores are immediately below the disc, though the current cores are not visible in the drawing. A closed copper ring 17 is commonly provided around the voltage pole portion 16 and forms a closed electrical circuit of low resistance for performing two purposes. One of these is to exert a torque on the disc to overcome friction in the rotation thereof, and with this purpose the present application is not concerned. The other purpose of the ring 17 is to retard the phase of the flux passing through the voltage core 16. Theoretically, under a given set of conditions this phase ring 17 could be designed to bring the phasing of the voltage flux accurately to that timed relation with respect to the phasing of the current flux which would produce accurate registration of the meter. In practice, however, for various reasons it is common to design the phasing ring 17 to overphase the meter, the meter then being brought back to proper phasing by a somewhat analogous phasing coil 18 on the current cores. In other words, the ring 17 retards the flux alternations in the voltage core 16 until they lag too much with respect to the current flux, and then the phasing coil 18 retards the current flux alternations by the amount of the excess lag of the voltage flux.

For a simplified understanding of the purpose of the present invention it may simply be recognized that the phasing coil 18 must be adjusted as to the amount of phase lag which it produces in order to make the meter register accurately. This adjustment of phase lag must be permanent and of course it is obviously desirable that the adjusting means be of a nature which makes delicate adjustments quite easy. The adjustment is in the nature of increasing or decreasing the resistance of the closed circuit formed by the coil 18. In the past this has been accomplished by means of twisting together resistance wires forming the leads extending away from the coil so as to shorten the amount of this resistance wire which was in the closed circuit. For permanency the wires were soldered at their junction point. According to the present invention the same effect is accomplished by the rheostat 11 which greatly facilitates adjustments. However, the requirements for delicacy of adjustment and for absolute dependability in the permanency of the adjustment require a novel form of rheostat.

The framework of the rheostat may conveniently comprise a channel shaped member 21 supported from the laminations 14 by a bracket 22. The bracket 22 may be welded to frame 21 and secured to the laminations by a suitable screw. At the front end of the frame 21 is an end plate 23 formed of any suitable insulating material, such as that known commercially as "Bakelite." The end plate 24 at the other end of the frame may most desirably be bent upwardly from the bottom of the frame 21. Carried by the end plates 23 and 24 is a screw 26 on which is threaded a sliding contact 27.

A loop of resistance wire 28 extends from the front of end plate 23 through a hole 29 (Fig. 7) in the end plate, along the inside of one side of the frame 21, around the rear end plate 24 which is notched as at 30 to hold the wire in place, back along the inside of the other side of the frame 21, out through the other hole 29, to the front of plate 23. The ends of this loop of resistance wire are soldered to eyelets 31 to which are also soldered the leads 32 from the phasing coil 18. The position of the holes 29 and the notches 30 is such with respect to the lateral spacing of the sides of frame 21 that the resistance wire 28 is naturally spaced from the frame 21 so as not to be short-circuited thereby. The slide 27, however, contacts both sides of the loop of wire 28 and hence shunts out that part of the resistance wire to the rear of the slide 27. In other words, when the slide 27 is adjacent the rear end plate 24 the maximum resistance of wire 28 is in the closed circuit of phasing coil 18 and the phase lagging effect of this coil is therefore at a minimum. As the screw 26 is rotated in the proper direction to move slide 27 toward front end plate 23, the slide 27 shunts out or short-circuits more and more of the resistance wire 28 until at the extreme forward position of slide 27 the only portion of the resistance wire 28 which remains in the circuit is that portion extending through the end plate 23 and on the front side thereof.

One of the difficulties in any low cost rheostat is to provide adequate contact pressure to provide substantially zero contact resistance between the sliding members as between the slide 27 and the wire 28. It should be recognized that this contact pressure must be quite high because of the tendency of the suitable metallic resistance wires to form a film of insulating oxide on their surface. This film may be so clear and thin as to be invisible, but may nevertheless be quite hard and produce a very substantial contact resistance between the two members if the contact pressure is not high enough to, in effect, break through the oxide film. It is necessary to substantially eliminate the contact resistance in order to eliminate variations therein which would render the phasing adjustment non-permanent. According to the present invention this vital high contact pressure is obtained by virtue of the fact that the channel frame member 21 is so shaped that its sides press inwardly toward the slide 27 with considerable resilient force, this entire force being exerted to press the wire 28 against the slide 27. Since the contact pressure is exerted entirely by metal, it will not weaken with time, as if some material which would shrink or flow away from the pressure area were used. The metal should be one which is nominally substantially non-corrosive to the extent that it will not materially weaken in any reasonable number of years, and it should be non-magnetic to avoid influencing the meter. Phosphor bronze has been found to be one highly satisfactory metal.

*Backlash elimination*

In order that fine adjustments may be made easily it is very important to substantially eliminate backlash so that, after an adjustment made by turning the screw in one direction, a slight turn of the screw in the other direction will have the expected adjusting effect rather than being materially consumed in taking up backlash. Three features are desirable in order to eliminate backlash—a resilient grip of the slide on the screw, a resilient or snug endwise mounting of the screw, and a taut resistance wire.

The slide may be made to resiliently engage the screw in a variety of ways, two of which are shown. In Fig. 5 it is seen that the slide 27 is of U-shape with both legs of the U threaded onto the screw 26. The natural shape of the U slide 27 is different from that shown, with the legs either further apart or closer together. The result is that these legs are sprung to the position shown and engage the threads with resilient pressure.

In Fig. 8 a slightly simpler slide is shown in which the threaded portion of the slide is split, the aperture for the screw 26 being normally slightly undersize with respect to the screw 26 so that they will have to be sprung apart to receive the screw 26 and hence will grip the screw 26 resiliently. Either of these slides will give fair satisfaction, that shown in Fig. 5 being preferred because of greater stability and dependability and because it includes the guard 33 described below. The greater stability is due to having the two points of engagement with the screw 26 longitudinally separated thereon to effectively prevent tilting of the slide 27.

The resilient or snug endwise mounting of the screw 26 is obtained by screwing a locking collar 35 onto the end of the screw after it has been inserted in place and screwing this collar 35 until it engages the end plate 24 with a snugness preventing any end play in the screw 26. The collar 35 may then be soldered to the end of the screw for permanency of this adjustment.

The wire 28 is made taut by virtue of extending around the end plate 24 and having its ends drawn taut before they are soldered to the eyelets 31. It will be observed that the wire 28 and the collar 35 both bear against the end plate 24. In practice they will flex this end plate inwardly so that it will engage them with a resilient pressure, which pressure will be divided between the wire and the collar 35. If preferred, the end plate 24 could be divided or shaped in such a way as to give greater independence to the resilient pressures which it exerts on the collar 35 and the wire 28. However, this is not at present believed necessary since even should there be slight end play in the screw 26 it will not ordinarily have any effect since a screw driver adjusting the screw 26 will keep it thrust in its rearward position with its head 36 resting against the end plate 23. The mounting of the slide together with reasonable tautness of the wire 28 and preferably with a snug mounting of screw 26 completely eliminate backlash, thus greatly facilitating fine adjustments.

Corrosion elimination

One problem which had to be overcome in securing permanency of adjustment was that of corrosion. Extensive corrosion would change the cross section of the resistance wire and hence change its resistance. This is eliminated by using a nickel wire which may be classed as nominally non-corrosive since a thin oxide film forms on the surface which protects it from further corrosion from atmospheres encountered in meter practice. A corrosion localized around the contact point between the slide 27 and the wire 28 would also be very damaging by virtue of increasing the contact resistance even though it did not affect the resistance of the wire as a whole. This is avoided by plating the slide with the same metal used in the wire. Thus, with a nickel wire the slide is nickel plated. The base material for the slide may be brass or any other suitable metal. The purpose of using like metals is to prevent electrolysis which may occur between exposed portions of different metals in contact and has a highly corrosive effect. Of course, other materials could be used if preferred. For example, both the wire and the slide could be gold plated. The important considerations are that the surface of the wire be nominally non-corrosive and that the contacting surfaces be of like metals to prevent electrolysis. One advantage of the nickel wire is that it has a high temperature coefficient of resistance which is desirable for temperature compensation to maintain the meter accuracy in spite of changes of temperature.

Side guard

One source of possible trouble would be found in direct contact between the wire 28 and the sides of the frame 21. Obviously if there should be electrical contact between them along the active portion of the resistance wire, this would shunt out or short-circuit a part of the resistance wire and render the rheostat very unsatisfactory. Furthermore, even contact between the resistance wire 28 and the frame 21 at the point of pressure may be objectionable in increasing corrosion due to electrolysis if the metals are not the same and in having a slightly varying point of contact, particularly if the wire 28 should happen not to be quite taut or should happen to have a hump in it. All such forms of direct contact between the wire 28 and the frame 21 can be prevented by coating the inside of the frame 21 with any suitable material such as a hard baking insulating enamel which, when baked, is hard enough to prevent the pressure which the frame exerts on the wire from breaking through the enamel.

A preferred form of separating the resistance wire 28 from the sides of the frame 21 is seen best in Figs. 4 and 5, in which it is seen that a U-shaped spacing guard 38 is carried between the legs of the slide 27 and extends between the wire 28 and the sides of the frame 21. The spacing guard 38 is provided with lugs 39 extending into and snugly fitting notches 40 in slide 27 so that the spacer guard 38 is retained in the proper vertical position with respect to slide 27. The spacing guard 38 also has shoulders 41 for bearing against the insides of the legs of the slide 27 so that the spacing guard 38 will be slid along with the slide 27.

The spacing guard 38 or at least the head portions thereof engaging the wire 28 should be plated with nickel to eliminate electrolysis between the wire and these heads. It is then immaterial that the spacer 38 is in electrical contact with the box 21. The spacer 38 keeps the wire 28 sufficiently far away from the frame 21 so that there is no danger of direct contact between the wire 28 and the frame 21, and hence the frame 21 need not be coated with an insulating enamel.

The notches 40 serve an additional function of positively holding the wire 28 from excessive drooping or from being pressed out from between the slide 27 and the frame 21 in case the wire should not be taut. For this reason notches 43 are provided in the slide 27′ shown in Fig. 8. These notches, however, should be of less depth than the thickness of the wire since the pressure of the sides of frame 21 must be exerted entirely on the wire and not directly on the slide 27. In like manner the depth of the notches 40 in Fig. 4 must be less than the combined thickness of the wire 28 and the guard 38.

Assembly

The assembly of the rheostat is quite simple. After the frame 21 has been stamped to shape and welded to the bracket 22, the screw 26 is inserted through end plate 23 and a slide 27 screwed thereon. The half looped wire 28 with an excess length at its ends may now be threaded through the holes 29 and inserted in the notches 40, after which the guard 38 may be sprung in place. Next, the screw 26 with its slide 27 is slipped into the box-like frame 21, the screw extending through the aperture in the end plate 24 of the box 21, and the box 21 fitting into a countersunk recess 46 in the rear of the end plate 23, which holds the end plate from twisting with respect to the frame 21. Then the collar 35 is screwed onto the screw 26 until it has flexed the end plate 24 somewhat so that this end plate will not be drawn away from the collar 35 when the wire 28 is drawn taut and the collar 35 is soldered at its end to the screw 26.

The rheostat is now ready for application to the meter or to the phasing coil (or to any other device to which it is to be attached). The ends of the leads 32 of the phasing coil are inserted into eyelets 31 and the ends of the resistance wire 28 are also threaded through said eyelets and drawn taut. Both wires may then be soldered jointly in each eyelet, connecting them together and simultaneously securing them to the eyelet, after which the excess ends of the resistance wire 28 may be clipped off.

From the foregoing it is seen that a meter is provided with an adjusting rheostat which is easily adjusted with any delicacy required and is dependably permanent in its adjustment. It is also seen that a rheostat has been provided for this or any other use which is exceedingly simple, which may be manufactured at extremely low cost and which yet provides a combination of delicacy of adjustment and permanency of adjustment heretofore unknown at least in a rheostat of comparably low cost. Such a rheostat is suitable for a use in which a single adjustment must remain constant throughout the life of the device to which the rheostat is applied.

The disclosures of this application are illustrative and the invention is not to be limited by them. In fact, if modifications or improvements are not at once obvious, they may be devised in the course of time to make additional use of the broad ideas taught and covered by this application. The claims are intended to point out novel features and not to limit the invention except as may be required by prior art.

I claim:

1. An electromagnetic driving unit for a meter disc including a laminated structure having side yokes and cores, a voltage coil carried by one of the cores, a current coil carried by another core, a phasing coil in inductive relationship to one of these coils, and a rheostat for adjusting the impedance of the circuit of the phasing coil, said rheostat including a small channel shaped metallic frame secured on the inside of the yoke, a slide movable within the frame, a screw extending longitudinally through the frame for operating the slide, and a resistance wire looped along opposite sides of the frame and pinched between the slide and the frame.

2. A watt-hour meter mechanism including a rotatable disc and a driving unit for rotating the disc including a voltage coil, a current coil, a phasing coil in inductive relationship to one of the other coils, and a rheostat in the circuit of the phasing coil for adjusting its phasing effect, said rheostat including a contact movable along a wire and urged against the wire with firm resilience and being constructed to produce infinitesimal variations in resistance and to maintain its adjustment indefinitely.

3. A watt-hour meter mechanism including a rotatable disc and a driving unit for rotating the disc including a voltage coil, a current coil, a phasing coil in inductive relationship to one of the other coils, and a rheostat in the circuit of the phasing coil for adjusting its phasing effect, said rheostat including a small channel-shaped metallic frame, a contact movable along a wire and urged against the wire by the frame with firm resilience and being constructed to produce infinitesimal variations in resistance and to maintain its adjustment indefinitely.

4. A watt-hour meter mechanism including a rotatable disc and a driving unit for rotating the disc including a voltage coil, a current coil, a phasing coil in inductive relationship to one of the other coils, and a rheostat in the circuit of the phasing coil for adjusting its phasing effect, said rheostat including a small channel-shaped spring metal frame, a contact movable along a wire and urged against the wire by the frame with firm resilience and being constructed to produce infinitesimal variations in resistance and to maintain its adjustment indefinitely; said wire being nominally non-corrosive, being substantially inert electrolytically with respect to the contact and being separated from the frame through the zone along which the contact moves.

STANLEY S. GREEN.